(12) United States Patent
Scacchi

(10) Patent No.: US 6,234,880 B1
(45) Date of Patent: May 22, 2001

(54) DEVICE AND METHOD FOR PROFILING GRINDING WORMS

(75) Inventor: Giorgio Scacchi, Hinwil (CH)

(73) Assignee: Reishauer AG, Wallisellen (CH)

( * ) Notice: Subject to any disclaimer, the term of this patent is extended or adjusted under 35 U.S.C. 154(b) by 0 days.

(21) Appl. No.: 09/510,370

(22) Filed: Feb. 22, 2000

(30) Foreign Application Priority Data

Mar. 11, 1999 (DE) .............................................. 199 10 746

(51) Int. Cl.[7] ........................................................ B24B 1/00
(52) U.S. Cl. ............................................. 451/47; 457/443
(58) Field of Search .............................. 451/8, 9, 10, 47, 451/51, 56, 57, 65, 443, 442, 242, 243

(56) References Cited

U.S. PATENT DOCUMENTS 4,073,281 * 2/1978 Asaeda et al. ........................ 451/443

4,557,078 * 12/1985 Brill ...................................... 451/56

FOREIGN PATENT DOCUMENTS

| 3715271A1 | 11/1987 | (DE) . |
| 19625370C1 | 4/1997 | (DE) . |
| 19624842A1 | 1/1998 | (DE) . |
| 19706867A1 | 8/1998 | (DE) . |

* cited by examiner

*Primary Examiner*—Derris H. Banks
(74) *Attorney, Agent, or Firm*—Browdy & Neimark

(57) ABSTRACT

A radius-forming dressing roll (32) having a frustoconical working region (48) and an adjoining concave-toroidal working region (49) is mounted on the dressing spindle (30) coaxially to a dressing disc (31). In a first step, the flanks (42, 43) of the grinding-worm thread are profiled with the disc (31). After the dressing spindle (30) has been pivoted, the two tip radii (46, 47) and the cylindrical outer circumference (45) are profiled with the dressing roll (32). With little resetting effort and high flexibility, the method permits profiling with short dressing times.

10 Claims, 2 Drawing Sheets

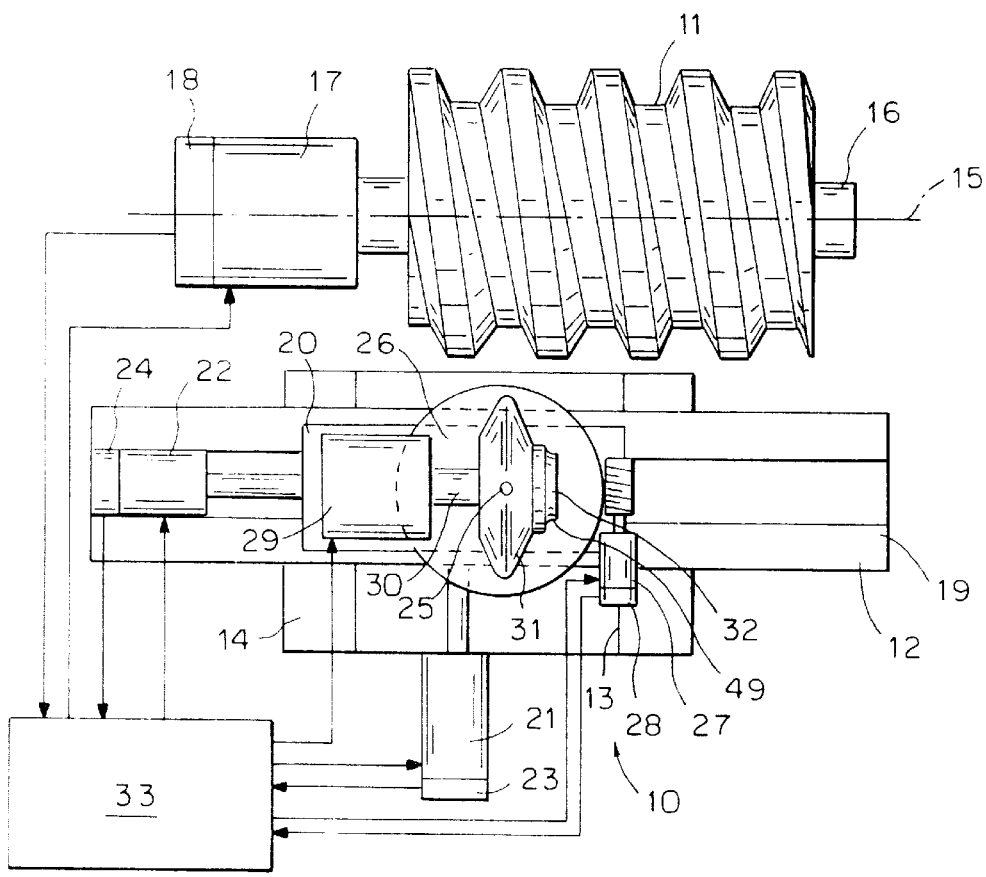
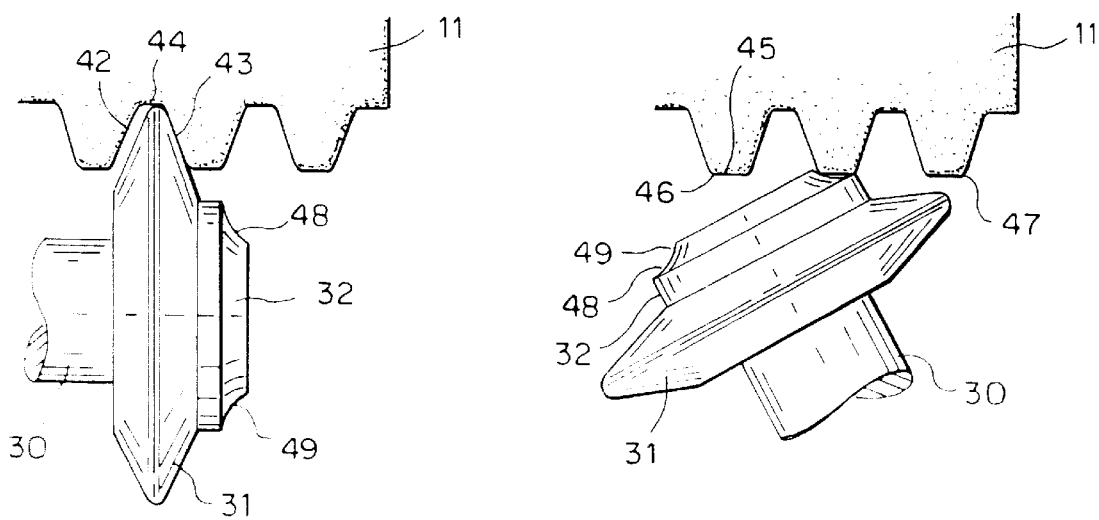
FIG.2  FIG.2a

DEVICE AND METHOD FOR PROFILING GRINDING WORMS

BACKGROUND OF THE INVENTION

Prior Art

One of the well-known and most widespread types of hard finishing of gears is the generation grinding of the tooth flanks by means of a cylindrical grinding wheel profiled in a worm shape at its circumference, the so-called grinding worm. The gear, when being ground, is brought into meshing engagement with the grinding worm, the tooth flanks of the gear being ground by the grinding-worm thread flanks and the tooth root being ground by the tip part of the grinding worm thread. This means that, before the grinding of the gear, the grinding worm thread has to be completely profiled in accordance with the tooth-gap profile of the workpiece.

A whole series of methods is known for the profiling of the grinding worm thread, the most efficient and the most widespread being that in which one dressing profile disc each is used for the dressing of the left-hand flank and the right-hand flank and a forming roll is used for the dressing of the tip of the grinding worm thread. The three tools, which are combined to form a tool set and in which the outside dimensions of the forming roll have to correspond to the root radius and tooth height of the respective workpiece, permit a short dressing time, since all their active abrasive tool surfaces covered with hard-material grains are in use simultaneously during dressing. However, the advantage of the high efficiency of this dressing method is offset by the disadvantage of limited flexibility or a high setting-up cost.

In another method, by means of a rotating dressing tool coated with hard-material grains at the active circumference, the entire active profile of the grinding worm is profiled line by line in point contact, specifically in such a way that line is placed around line right next to each other until the entire active thread profile is dressed. This method requires only a single dressing tool and is exceptionally flexible with regard to the profile of the thread. However, it has the disadvantage of being very slow. This disadvantage partly still exists even if, as in DE-A 196 24 842 A1, the line-by-line profiling is combined with the use of dressing profile discs.

OBJECT AND SUMMARY OF THE INVENTION

The aim of the present invention is to specify a method and a device by means of which, despite the little presetting constructional effort required and despite high flexibility, the profiling of the entire active grinding worm thread profile is possible with short dressing times. According to the invention, this is achieved by the combination of a dressing profile disc, coated with hard material grains on two faces, for profiling the two grinding worm thread flanks and a radius-forming roll, arranged coaxially hereto and coated on the circumference with hard material grains, for profiling the tip of the grinding worm thread, the active zone of the radius-forming roll being geometrically configured and arranged in such a way that it can be brought into use without collision by axial displacement and pivoting of the dressing spindle relative to the grinding worm. Instead of the double tapered dressing disc coated with hard material grains on two sides, the combination of two single tapered dressing discs, for example, may also be used.

A variant of the invention is the dressing of the grinding worm thread tip by means of a hard material radius-forming tool, mounted on the pivoting support of the dressing spindle, instead of the above radius-forming roll, as a result of which the displacement travel of the dressing device between the dressing of the thread and the circumference of the grinding worm can be reduced.

BRIEF DESCRIPTION OF THE DRAWING

Exemplary embodiments of the device according to the invention for carrying out the method described above are explained below. In the drawing:

FIG. 1 shows a plan view of a profiling device,

FIGS. 2, 2a, 2b show the profiling operation, and

DETAILED DESCRIPTION OF THE PREFERRED EMBODIMENT(S) OF THE INVENTION

Figure 2B:
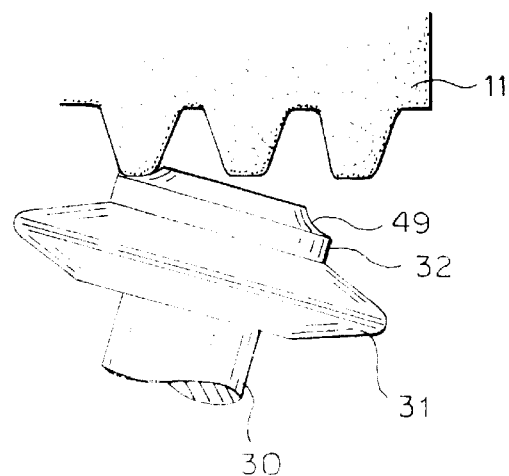

FIG. 1 shows a dressing device 10 for profiling a grinding worm 11. The dressing device may be designed, for example, according to DE-A-197 06 867.7. It comprises a cross slide, a first slide 12 being displaceable along a guide 13 of a machine base 14 perpendicularly to the axis 15 of the grinding spindle 16. The grinding worm 11 is mounted on the spindle 16, which is driven by a motor 17 and is connected to a rotary encoder 18. On the slide 12, a second slide 20 is displaceable guided in a guide 19 parallel to the axis 15. The slides 12, 20 are each displaceable by a respective motor 21, 22 with displacement feedback 23, 24. Mounted on the slide 20 is a rotary table 26, which is pivotable about an axis 25 perpendicular to the axis 15 and to the guide 13. The pivoting movement of the rotary table 26 is controlled by means of a further servomotor 27 with rotary encoder 28. Mounted on the rotary table 26 is a dressing motor 29, which drives the dressing spindle 30, on which the dressing disc 31 and the radius-forming roll 32 are coaxially mounted. All the servomotors 17, 21, 22, 27, the rotary encoders 18, 23, 24, 28 and the motor 29 are connected to a control device 33.

Unlike the representation according to FIG. 1, the grinding spindle 16 may also be mounted on a cross slide for the relative movement between the grinding worm 11 and the dressing tools 31 and 32, for which purpose the pivoting table 26 of the dressing spindle 30 is mounted in a fixed position on the machine base. This variant is advantageous in particular when the grinding worm 11 is moved parallel and perpendicularly to the axis 15 for grinding the workpieces. In this case, the same NC axes of the machine may be used for both grinding and dressing, as described in DE-A 196 25 370.5.

FIG. 2 shows a detail view in which the dressing wheel 31 is in engagement with the grinding worm 11 for profiling one of the two grinding worm thread flanks 42, 43.

In FIG. 2a, the dressing spindle 30 is located in the angular position in which the circumference 45 and the left-hand tip radius 46 of the grinding worm thread are dressed. FIG. 2b shows the position of the dressing spindle 30 when profiling the right-hand tip radius 47 of the grinding worm thread. The radius-forming roll 32 has a frustoconical section 48, which is coated with hard-material grains and dresses the cylindrical circumference 45, and a tangentially adjoining concave-toroidal section 49, the radius of curvature of which, in axial section, corresponds to the radius of curvature of the tip radii 46, 47 or is larger than the latter, and in the latter case the radius-forming roll 32 can be used universally, but the tip radii 46, 47 in that case have to be dressed line by line.

Figure 3A:
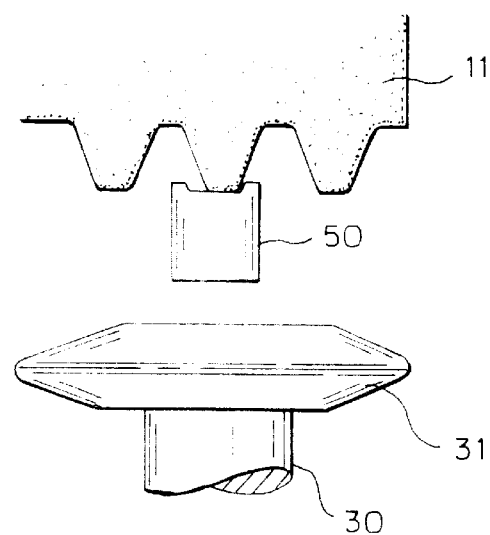
FIGS. 3a and 3b show a second embodiment.
Figure 3B:
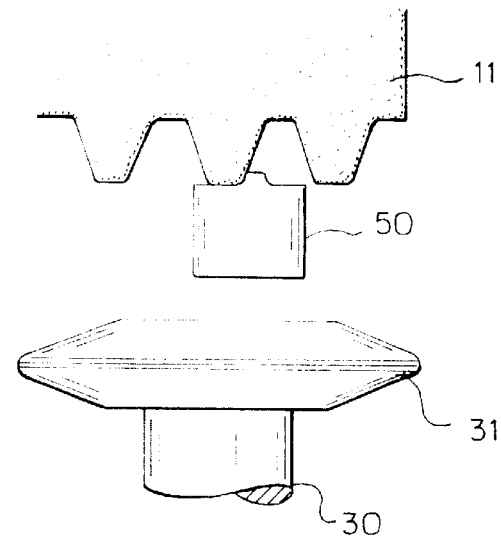

FIGS. 3a and 3b show the dressing disc 31 and the non-rotating radius-forming tool 50, fastened to the rotary table 26 rotatable about the axis 25, in two different embodiments.

The profiling of the grinding worm 11 is effected in three steps. In the first step, the thread flank profile 42, 43 and the tooth root 44 of the grinding worm 11 are dressed with by dressing disc 31. During this step the dressing spindle 30 is located in the position according to FIGS. 1 and 2. In the second step, the circumference 45 and the left-hand tip radius 46 of the grinding worm thread are profiled with the radius-forming roll 32, in which case the dressing spindle 30 has been pivoted beforehand about the axis 25 into the angular position of FIG. 2a and brought into the engagement position by displacing the slides 12 and 20. The right-hand tip radius 47 of the grinding worm thread is then profiled in the third step, for which purpose the dressing spindle 30 is pivoted and displaced again. In the third step, its angular position corresponds to the arrangement of FIG. 2b.

In the variant in which, instead of the radius-forming roll 32, the fixed profile-dressing tool 50 of hard material is used for profiling the circumference 45 and the tip radii 46, 47 of the grinding worm thread, the circumferential dressing of the grinding worm 11 is effected in that angular position of the dressing spindle 30 which is shown in FIGS. 3a and 3b, the radius-forming tool 50, like a form turning tool during screw-thread cutting, being in engagement with the tooth tip of the grinding worm thread. Depending on the arrangement of the tool 50 on the pivoting table 26, another angular position is also possible.

What is claimed is:

1. Device for profiling a thread of a grinding worm (11) for the continuous generation grinding of gears, comprising a grinding spindle (16) with a grinding spindle axis (15), a grinding worm (11) being mounted on the grinding spindle (16), a dressing spindle (30) on which a first dressing tool (31) for dressing flanks (42, 43) of the grinding worm thread is mounted, two slides (12, 20) with which the dressing spindle (30) can be fed in radially relative to the grinding spindle (16) and is traversable parallel to the grinding spindle axis (15), and a rotary table (26) which is pivotable about an axis (25) perpendicular to the grinding spindle axis (15) and on which the dressing spindle (30) is rotatably mounted, characterized in that a second dressing tool (32, 50) for dressing tip radii (46, 47) and a circumference (45) of the grinding worm thread is additionally pivotable with the rotary table (26), and in that the first and second dressing tools (31, 32, 50) can be brought into engagement with the grinding worm (11) one after the other by pivoting of the rotary table (26) and displacement by means of the slides (12, 20).

2. Device according to claim 1, the second dressing tool being a radius-forming roll (32) which is coated with hard-material grains and is mounted on the dressing spindle (30) coaxially to the first dressing tool (31).

3. Device according to claim 2, an active region of the radius-forming roll (32) having a concave-toroidal section (49).

4. Device according to claim 3, the active region of the radius-forming roll (32) additionally having a frustoconical section (48) tangentially adjoining the concave-toroidal section (49).

5. Device according to claim 1, the second dressing tool (50) being a profile-dressing tool which is firmly connected to the rotary table (26) and, in working region, is made of hard material, in particular diamond or CBN.

6. Method of profiling a thread of a grinding worm (11) for the continuous generation grinding of gears, a dressing spindle (30), relative to a grinding spindle (16) on which the grinding worm (11) is mounted, being traversable parallel and perpendicularly to a grinding spindle axis (15), and a first dressing tool (31) which is coated with hard-material grains and with which flanks (42, 43) of the grinding worm thread are profiled being fastened to the dressing spindle (30), the dressing spindle (30) additionally being pivotable relative to the grinding spindle (16) about a pivot axis (25) perpendicular to the grinding spindle axis (15), characterized in that a second dressing tool (32, 50) which is pivoted together with the dressing spindle (30) relative to the grinding spindle (16) is used, in that a tip region (45–47) of the grinding worm thread is profiled with the second dressing tool (32, 50), and in that the flanks (42, 43) and the tip region (45–47) are profiled in successive steps.

7. Method according to claim 6, a radius-forming roll (32) which is mounted coaxially to the first dressing tool (31.) on the dressing spindle (30) being used as second dressing tool.

8. Profiling tool for carrying out the method according to claim 7, comprising a radius-forming roll (32) which is coated with hard-material grains on an active surface, the active surface having a concave-toroidal section (49).

9. Profiling tool according to claim 8, the active surface additionally having a frustoconical section (48), which tangentially adjoins the concave-toroidal section (49).

10. Method according to claim 6, the second dressing tool being arranged rigidly on a support (26), on which the dressing spindle (30) is rotatably mounted.

* * * * *